United States Patent [19]

Maruyama

[11] Patent Number: 5,077,568
[45] Date of Patent: Dec. 31, 1991

[54] CAMERA CONTROL APPARATUS HAVING POWER-SAVING FUNCTION

[75] Inventor: Atsushi Maruyama, Yokohama, Japan

[73] Assignee: Olympus Optical Co., Ltd., Tokyo, Japan

[21] Appl. No.: 624,188

[22] Filed: Dec. 6, 1990

[30] Foreign Application Priority Data

Dec. 14, 1989 [JP] Japan .................................. 1-322708

[51] Int. Cl.$^5$ ................................................ G03B 1/12
[52] U.S. Cl. .............................................. 354/173.11
[58] Field of Search .................................... 354/173.11

[56] References Cited

U.S. PATENT DOCUMENTS 4,659,201  4/1987  Suzuki et al. ............... 354/173.11 X

FOREIGN PATENT DOCUMENTS

61-183630  8/1986  Japan .
1-217434   8/1989  Japan .
1-257930  10/1989  Japan .

*Primary Examiner*—Michael L. Gellner
*Attorney, Agent, or Firm*—Frishauf, Holtz, Goodman & Woodward

[57] ABSTRACT

A camera control apparatus comprises a film-moving section, a control section, a latch section, a monitor section, a timer section and a standby-releasing section. The film-moving section incorporates a motor and moves the film loaded in a camera. The control section controls various control sections incorporated in the camera, and outputs a predetermined control signal in accordance with a film-moving command and supplies the control signal to the film-moving section. The control section includes a function for bringing itself into a standby condition. The latch section latches the predetermined control signal output by the control section and allows the film-moving section to be continuously driven. The monitor section generates a monitor signal in accordance with the state in which the film is moved by the film-moving section. The timer section starts measurement of a predetermined time interval in response to the control signal output by the control section, and generates an end signal at the end of the measurement. The standby-releasing section supplies a standby state-releasing signal to the control section in accordance with either the end signal generated by the timer section or the monitor signal generated by the monitor section.

15 Claims, 12 Drawing Sheets

CAMERA CONTROL APPARATUS HAVING POWER-SAVING FUNCTION

BACKGROUND OF THE INVENTION

1. Field of the Invention

The present invention relates to a camera control apparatus and, more particularly, to a camera control apparatus which uses the same controller for film control and control of other kinds.

2. Description of the Related Art

In general, when the film inside a camera is moved (wound or rewound), the power consumption by the motor continues for a long time. If the camera is driven by a battery, the voltage provided by the battery gradually decreases in level, to thereby exist an internal register therein. In some cases, the level of the voltage becomes too low to drive the controller that controls the film movement.

To solve this problem, a conventional camera employs a booster circuit, by which the voltage applied to the controller is stabilized. Alternatively, the conventional camera employs a large-capacitance capacitor, by which the power source voltage is backed up at the time of application of a heavy load.

However, the use of the booster circuit or the large-capacitance capacitor results in an increase in the manufacturing cost of the camera. In addition, the use of the booster circuit and the capacitor requires a wide installation space inside the camera.

SUMMARY OF THE INVENTION

It is, therefore, an object of the present invention to provide a new and improved camera control apparatus having a power-saving function, which eliminates the need to employ a booster circuit or large-capacitance capacitor and therefore requires no wide installation space, which prevents the power source voltage from decreasing and becoming too low to drive the controller even when the film inside the camera is being wound or rewound, and which is low is price and small in size.

According to the present invention, there is provided a camera control apparatus which comprises:

film-moving means, having a motor, for moving a film loaded in a camera;

controller means for controlling various control sections incorporated in the camera, the controller means outputting a predetermined control signal in accordance with a film-moving command and supplying the predetermined control signal to the film-moving means, the controller means including means for bringing itself into a standby condition;

latch means for latching the predetermined control signal output by the controller means to thereby allow the film-moving means to be continuously driven;

monitor means for generating a monitor signal in accordance with a state in which the film is moved by the film-moving means;

timer means for starting measurement of a predetermined time interval in response to the predetermined control signal output by the controller means and generating an end signal at the end of the measurement; and standby-releasing means for supplying a standby state-releasing signal to the controller means in accordance with one of the end signal generated by the timer mean and the monitor signal generated by the monitor means.

With the above structure, the camera control apparatus of the present invention maintains the controller means in a standby state when the film is being moved. Therefore, the power consumption by the controller means can be reduced during the movement of the film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

Embodiments of the invention will be explained below, with reference to the accompanying drawings.

First of all, the structure of the entire system incorporating a camera control apparatus of the present invention will be described with reference to FIGS. 1A and 1B.

Figure 1A:
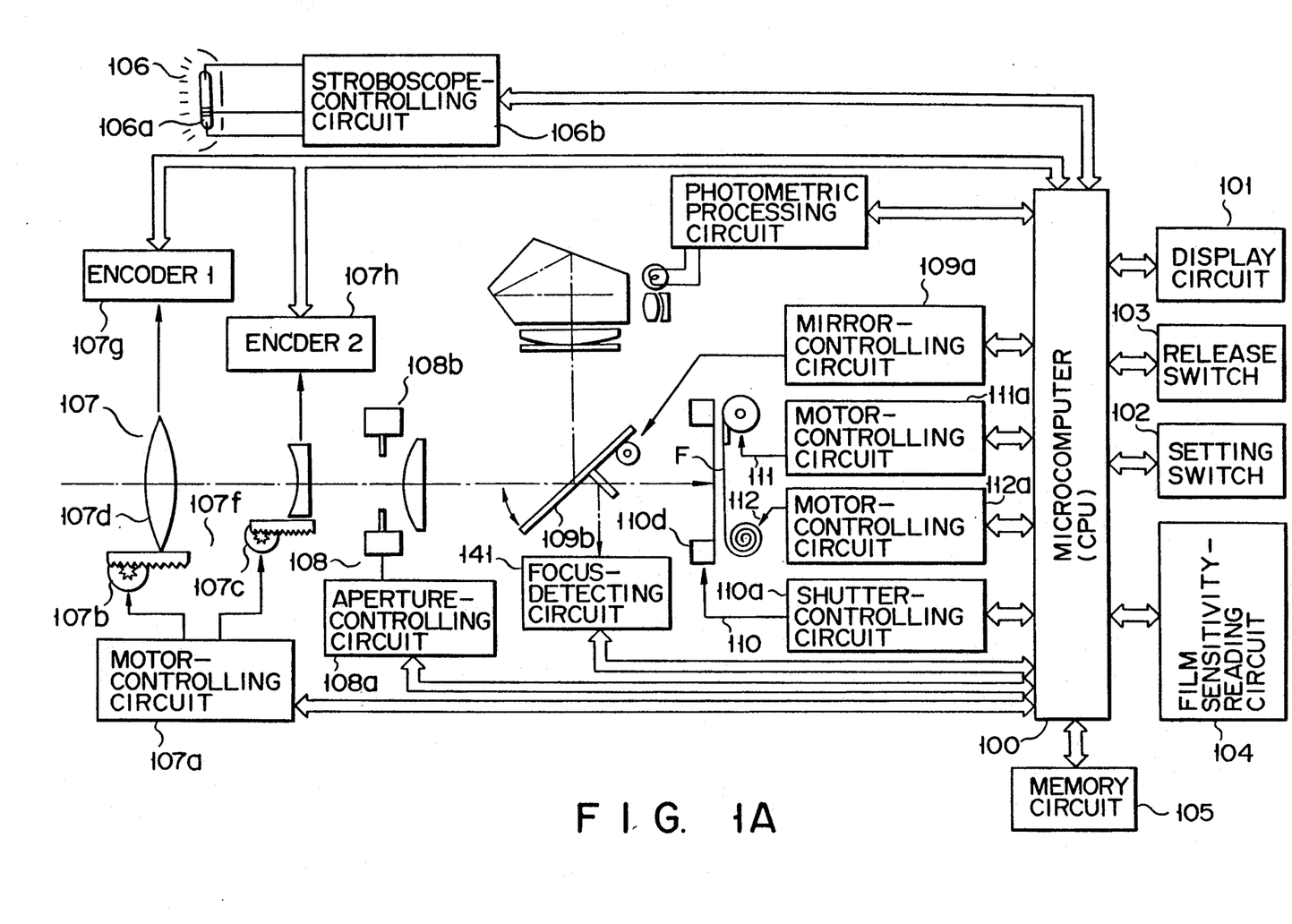
FIG. 1A is a block circuit diagram showing the entire system to which a camera control apparatus embodying the present invention is applied.

Referring to FIG. 1A, reference numeral 100 denotes a CPU 100 (i.e., a microcomputer serving as a controller) which performs general control of a camera. A display circuit 101 which permits data of various kinds to be indicated inside the camera is connected to the CPU 100. A setting switch 101 with which the camera is set in various manners is also connected to the CPU 100. Further, a release switch 103, a film sensitivity-reading circuit 104 and a memory circuit 105 are connected to the CPU 100.

Moreover, the following systems are connected to the CPU 100: a stroboscope-controlling system 106, a lens-driving system 107, an aperture-driving system 108, a mirror-driving system 109, a shutter-driving system 110, and film-winding and film-rewinding systems 111 and 112 (which jointly constitute a film-moving system). These systems will be explained one by one.

The stroboscope-controlling system 106 comprises a stroboscope control circuit 106a and a stroboscope 106b. Upon reception of a given command output by the CPU 100, the stroboscope control circuit 106a causes the stroboscope 106b to flash.

The lens-driving system 107 performs so-called auto focusing (AF) and zooming. It comprises a motor control circuit 107a, first and second motors 107b and 107c, first and second lenses 107d and 107e (which are connected through gears to the first and second motors 107b and 107c, respectively, and which jointly constitute a lens-driving mechanism 107f), and first and second encoders 107g and 107h. Upon reception of a given command from the CPU 100, the motor control circuit 107a controls the first and second motors 107b and 107c, so as to move the first and second lenses 107d and 107e in a predetermined manner. The positional information regarding the first lens 107 is fed back to the CPU 100 through the first encoder 107g; likewise, the positional information regarding the second lens 107e is fed back to the CPU 100 through the second encoder 107h.

The aperture-driving system 108 comprises an aperture control circuit 108a, an aperture motor 108b (FIG. 1B), and an aperture mechanism 108c incorporating the aperture motor 108b. Upon reception of a given command from the CPU 100, the aperture control circuit 108a controls the aperture mechanism 108c.

The mirror-driving system 109 comprises a mirror control circuit 109a, and a mirror 109b which is rotatable in the manner indicated by the arrow in FIG. 1A. Upon reception of a given command from the CPU 100, the mirror control circuit 109a controls the rotation of the mirror 109b.

The shutter-driving system 110 comprises a shutter control circuit 110a, a shutter-driving motor 110b, a shutter charge mechanism 110c (FIG. 1B), and a shutter 110d. Upon reception of a given command from the CPU 100, the shutter control circuit 110a controls both shutter-driving motor 110b and shutter charge mechanism 110c, which in turn control the shutter 110d.

Figure 1B:
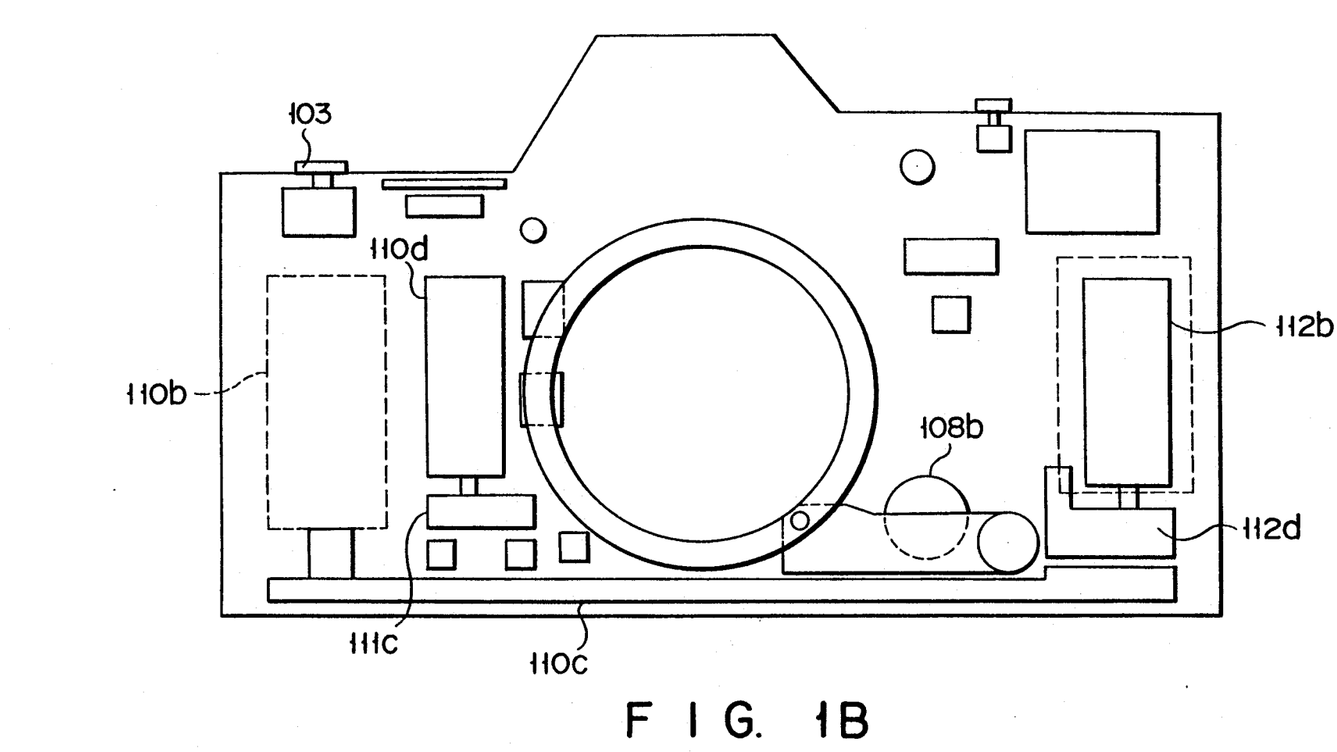
FIG. 1B is an elevation view illustrating how the major components of the system shown in FIG. 1A are arranged.

The film-winding system 111 comprises a motor control circuit 111a, a film-winding motor 111b, and a film-rewinding transmission 111c (FIG. 1B). Upon reception of a given command from the CPU 100, the motor control circuit 111a controls the film-winding motor 111b and transmission 111c, so as to wind a film F. Likewise, the film-rewinding system 112 comprises a motor control circuit 112a, a film-rewinding motor 112b, and a film-rewinding transmission 112d (FIG. 1B). Upon reception of a given command from the CPU 100, the motor control circuit 112a controls the film-rewinding motor 112b and transmission 112d, so as to rewind the film F. The command for winding or rewinding the film F is selectively supplied to the two motor control circuits 111a and 112a.

Reference numeral 113 in FIG. 1A denotes a photometric processing system comprising a pentagonal prism 113a, a photodiode (SPD) 113b, and a photometric processing circuit 113c. The light (information) which is reflected by mirror 109b is converted into an electric signal, and this electric signal is supplied to the CPU 100 after being processed.

Part of the light passing through mirror 109b travels through mirror 140. This light is directed to the film F. The remaining part of the light passing through mirror 109b is reflected by mirror 140. This light is guided to a focus-detecting circuit 141, and this focus-detecting circuit 141 provides the CPU 100 with focus detection information.

The camera-controlling operations mentioned above are performed, using the voltage provided by a battery 11 as later described. The voltage provided by the battery 11 is limited, so that the present invention aims to reduce the power consumption to the possible degree when the film F is being wound or rewound.

The key point of the present invention will now be described, with reference to FIG. 1C. This Figure illustrates major structural components which are included in the system shown in FIG. 1A and which are directly relevant to the essence of the present invention. It is a schematic diagram showing the fundamental structure of the camera control apparatus according to one embodiment of the present invention.

In FIG. 1C and FIGS. 2–10, the film-winding motor and the film-rewinding motor are shown as being constituted by a single motor. As is suggested from this, only one motor may be used for both the winding and rewinding of the film F.

Figure 1C:
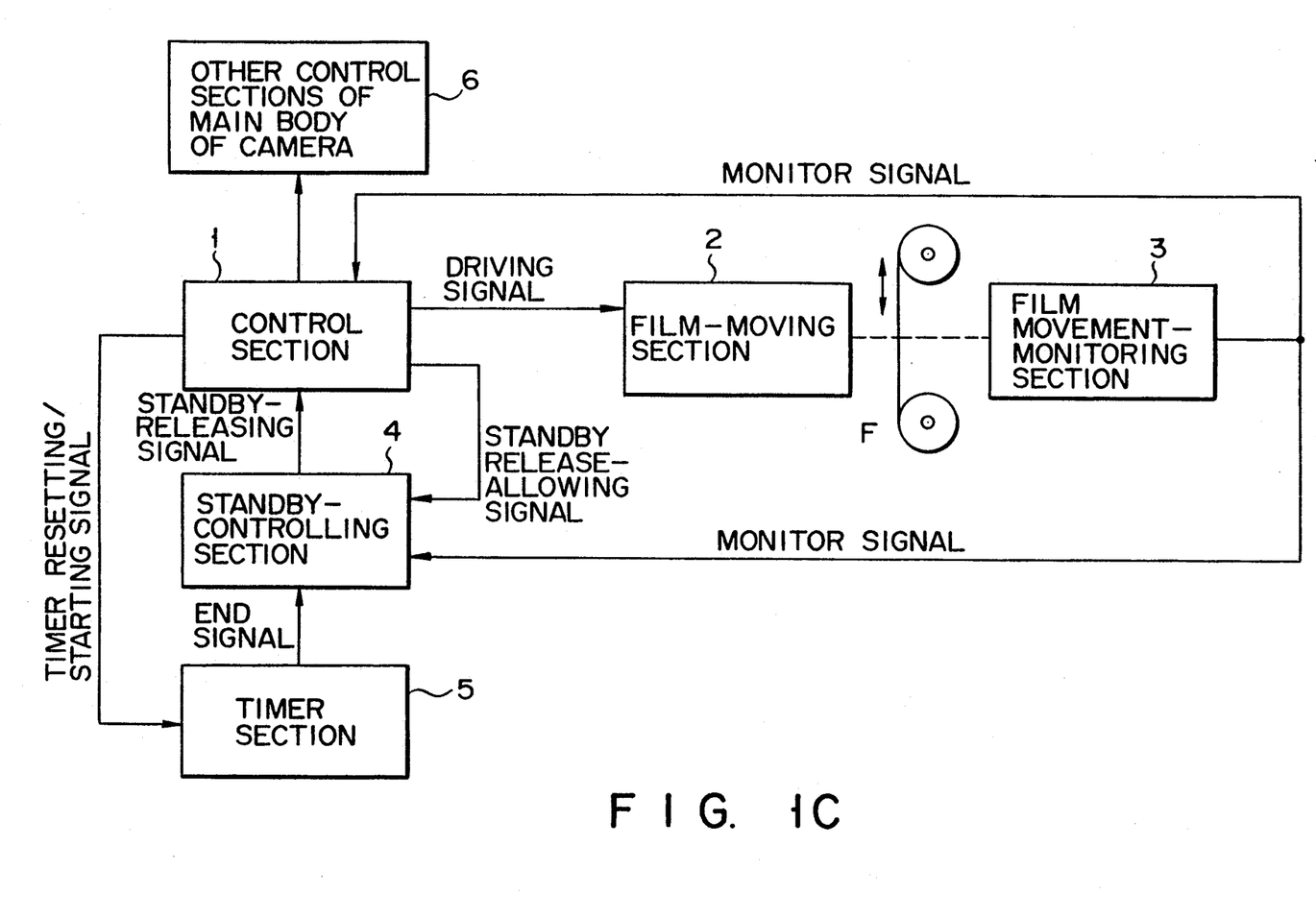
FIG. 1C is a block circuit diagram showing the fundamental structure of the camera control apparatus according to the embodiment of the present invention.

As is shown in FIG. 1C, the camera control apparatus is made up of the following: a film-moving section 2 driven by a motor (which will be mentioned later); a control section 1 which controls the film-moving section 2 to move or stop a film and which is set in a standby state in response to the movement of the film; a film movement-monitoring section 3 which generates a monitor signal in accordance with the state of the film moved by the film-moving section 2; a timer section 5 which starts measurement of a predetermined time interval in response to the control performed by the control section 1 and generates an end signal at the end of the measurement; a standby-controlling section 4 which releases the control section 1 from the standby state in response to either the end signal output from the timer section 5 or the monitor signal output from the film movement-monitoring signal 3; and other control sections 6 which are incorporated in the main body of the camera and the operations of which are controlled by the above control section 1 only when this control section 1 is released from the standby state.

When the film should be moved (wound or rewound), the control section 1 supplies a driving signal to the film-moving means 2. Further, it supplies a standby release-allowing signal and a timer resetting/- starting signal to the standby-controlling section 4 and the timer section 5, respectively. After supplying these signals, the control section 1 is set in a standby state (i.e., a power-saving state), so as to stop the control operations performed by the control sections incorporated in the main body of the camera.

Upon reception of the driving signal from the control section 1, the film-moving means 2 starts moving the film. Due to the action of a latch circuit to be mentioned later, the film-moving means 2 can continue to move the film even after the control section 1 is set in the standby state.

The film movement-monitoring section 3 monitors the film moved by the film-moving section 3, and outputs a monitor signal when the film has been moved by one frame, for example.

Upon reception of the timer resetting/starting signal from the control section 1, the timer section 5 starts measurement of a time interval. After measuring the time interval, the timer section outputs an end signal.

Upon reception of either the monitor signal output from the monitor section 3 or the end signal output from the timer section 5, the standby-controlling section 4 produces a standby-releasing signal, by which the control section 1 is released from the standby state.

A description will now be given of the operation of the camera control apparatus mentioned above. Assume that a command for moving a film F is issued. In response to this command, a driving signal is supplied from the control section 1 to the film-moving section 2. Thus, the film-moving section 2 starts moving the film F.

Further, the control section 1 outputs a standby release-allowing signal and a timer resetting/starting signal, and these two signals are supplied to the standby-controlling section 4 and the timer section 5, respectively. Thereafter, the control section 1 is set in a standby state. The film-moving section 2 can move the film F even when the control section 1 is in the standby state, and the film moved by the film-moving section 2 is monitored by the film movement-monitoring section 3.

The timer section 5 starts time measurement at the same time when the film-moving section 2 starts moving the film F.

Assume that the film movement-monitoring section 3 outputs a monitor signal, or that the timer section 5 outputs an end signal. The monitor signal or the end signal is supplied to the standby-controlling section 4. Upon reception of the signal, the standby-controlling section 4 outputs a standby-releasing signal and supplies it to the control section 1. Accordingly, the control section 1 is released from the standby state; it is brought into an operating state.

Figure 2:
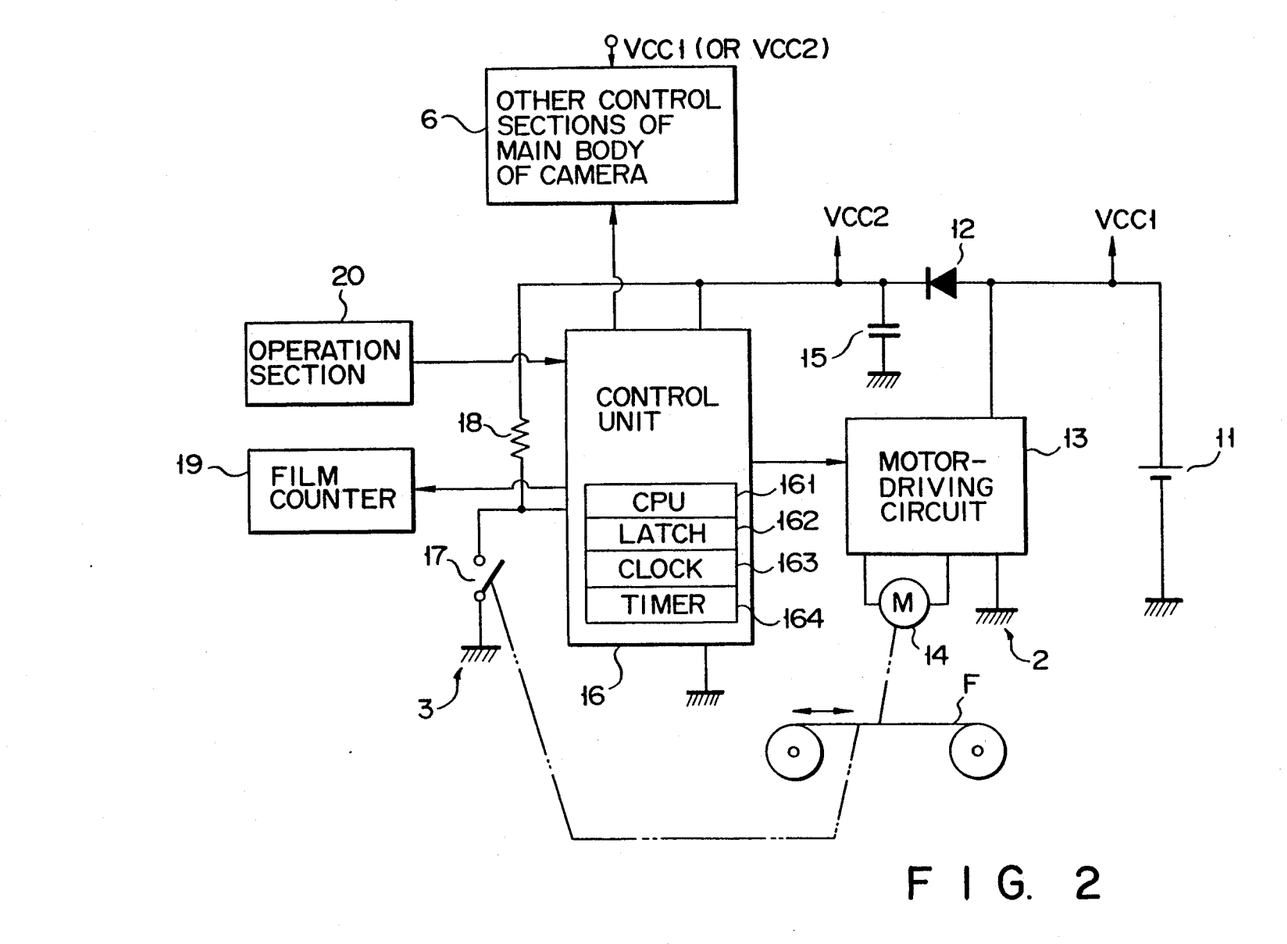
FIG. 2 shows the fundamental structure in a more specific manner.

FIG. 2 illustrates, in a more specific way, the structure of the camera control apparatus shown in FIG. 1C.

Referring to FIG. 2, a power source 11 provides a voltage Vcc1 which is necessary for driving the camera. The power source 11 is made by a battery, for example.

A motor-driving circuit 13 drives a motor 14, to thereby move the film F. The motor-driving circuit 13 and the motor 14 jointly constitute the film-moving section 2 mentioned above.

A detection switch 17 is turned on or off in accordance with the condition in which the film F is moved by the motor 14, and constitutes the film movement-monitoring section 3 mentioned above. The detection switch 17 may be provided independently of the other detection switches; alternatively, it may be constituted by a one frame advance-detecting switch which is provided for the camera main body to detect a one frame-advancing movement of the film F.

A control unit 16 comprises: a controller (CPU) 161 (which constitutes the control section 1 shown in FIG. 1C); an output latch circuit 162 (which is a peripheral circuit of the controller 161); a system clock circuit 163; a timer circuit 164 (which constitutes the timer section 5 mentioned above); etc. The controller 161 can be released from the standby state (i.e., an inoperative state) if a predetermined standby-releasing condition is satisfied. Either a drop in the level of the monitor signal which occurs when the detection switch 17 is turned on, or an overflow state of the timer circuit 164 can be used as the standby-releasing condition.

The "standby state" of the controller 161 refers to a state where power consumption is small, and is brought about immediately after a command for moving the film is supplied to the motor-driving circuit 13. In the standby state, the controller 161 does not permit the other control sections 6 of the camera main body to operate, and only the structural components that are absolutely required for the operation of the camera (such as the output latch circuit 162, the system clock circuit 163, and timer circuit 164) are kept operative.

In FIG. 2, reference numeral 15 denotes a capacitor used for backing up the power source voltage Vcc1, reference numeral 12 denotes a diode which compensate for a decrease in charge voltage Vcc2 arising from the provision of the capacitor 15, reference numeral 18 denotes a pull-up resistor used for the detection switch 17, reference numeral 19 denotes a film counter which counts film frames in an ascending or descending order in response to the ON/OFF operations of the detection switch 17, and reference numeral 20 denotes an operation section from which commands of various kinds are given to the control unit 16.

Figure 3:
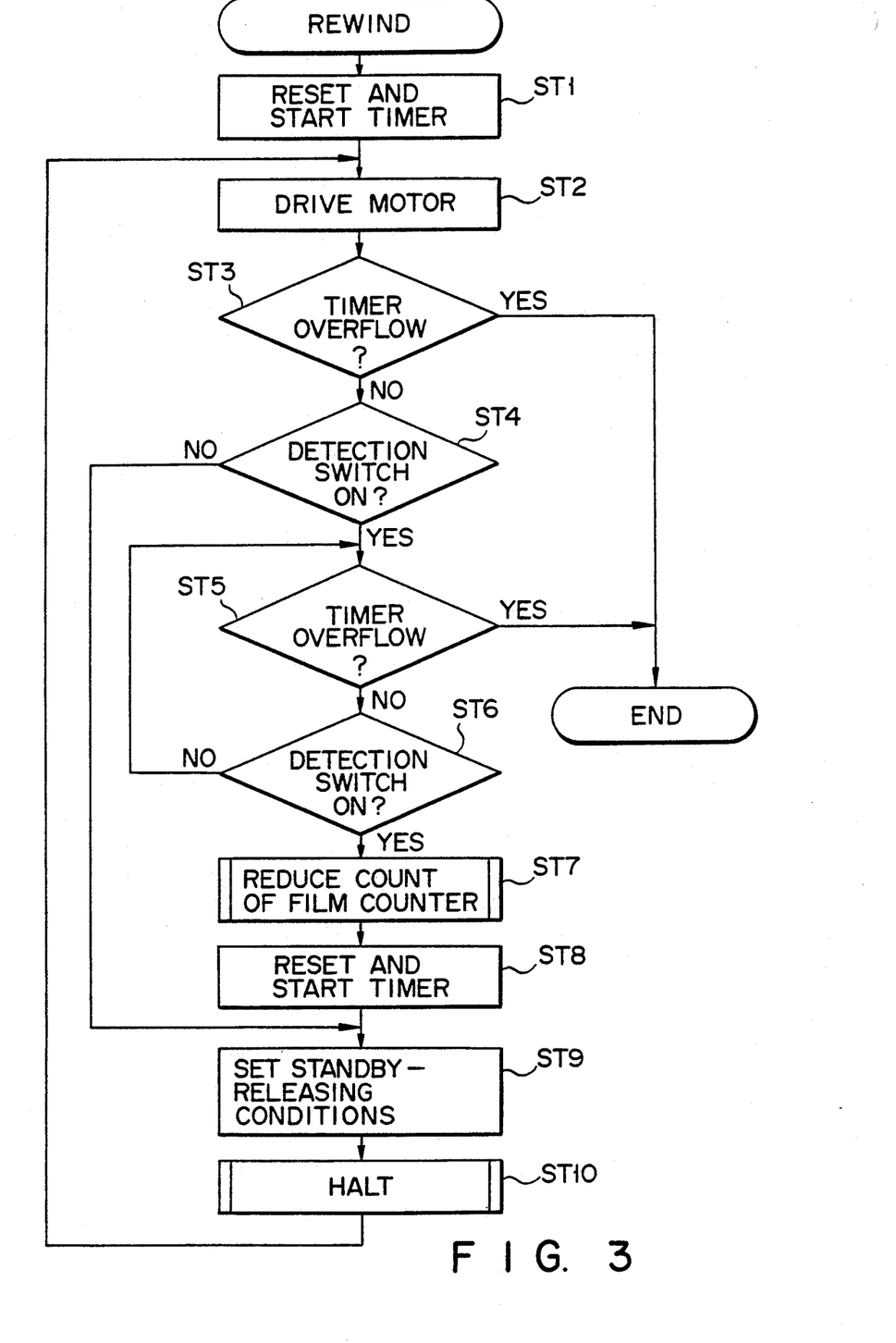
FIGS. 3 and 4 illustrate a case where either the ON-state of the detection switch (FIG. 2) or the overflow state of the timer circuit (FIG. 2) is utilized as a standby-releasing condition, FIG. 3 being a flowchart according to which the structure shown in FIG. 2 performs a film-rewinding operation, and FIG. 4 being a timing chart showing how the camera control apparatus operates during the film-rewinding operation.

The operation of the above camera control apparatus will be described, with reference to the flowchart shown in FIG. 3.

Let it be assumed that the film F loaded in the camera has been used up to the end and a command for rewinding the film F has been entered from the operation section 20. In this case, the control units 16 operates as follows. First, the controller 161 supplies a timer resetting/starting signal to the timer circuit 164 in step ST1. Further, the controller 161 supplies a driving signal to the motor-driving circuit 13 in step ST2. Accordingly, the timer circuit 164 starts a counting operation, and the motor 14 is driven to rewind the film F.

Thereafter, it is determined in step ST3 whether the timer circuit 164 overflows or not. If it is determined that the timer circuit 164 does not overflow, then the state of the detection switch 17 is checked in step ST4.

For instance, if the one-frame movement of the film F has not yet been completed, the detection switch 17 is OFF. In such a case, the standby-releasing condition is set in step ST9, and then the controller 161 is brought into a standby state (HALT) in step ST10. Even after the controller 161 is brought into the standby state, the rewinding of the film F can be continued, because of the provision of the output latch circuit 162.

If the detection switch 17 is turned on, the controller 161 is released from the standby state, and the procedures starting from step ST2 are repeated.

If it is determined in step ST4 that the detection switch 17 is ON, then steps ST5 and ST6 are repeated until the detection switch 17 is turned off.

If it is determined in step ST6 that the detection switch 17 is OFF, the count of the film counter 19 is decreased in step ST7. Incidentally, the steps for the determination of the OFF state of the detection switch 17 may be omitted from the flowchart shown in FIG. 3, as long as the detection switch 17 is free from chattering or noise which may be included therein from the motor 14.

After the count of the film counter 19 is decreased in the accordance with the one-frame movement of the film F, a command for resetting and starting the timer circuit 164 is issued once again in step ST8, and the procedures starting from step ST9 are repeated.

If it is determined in steps ST3 and ST5 that the timer circuit 164 overflows, the controller 161 is brought back into an operating state. In other words, the controller 161 is set in an operative state, and the rewinding operation is completed.

Figure 4:
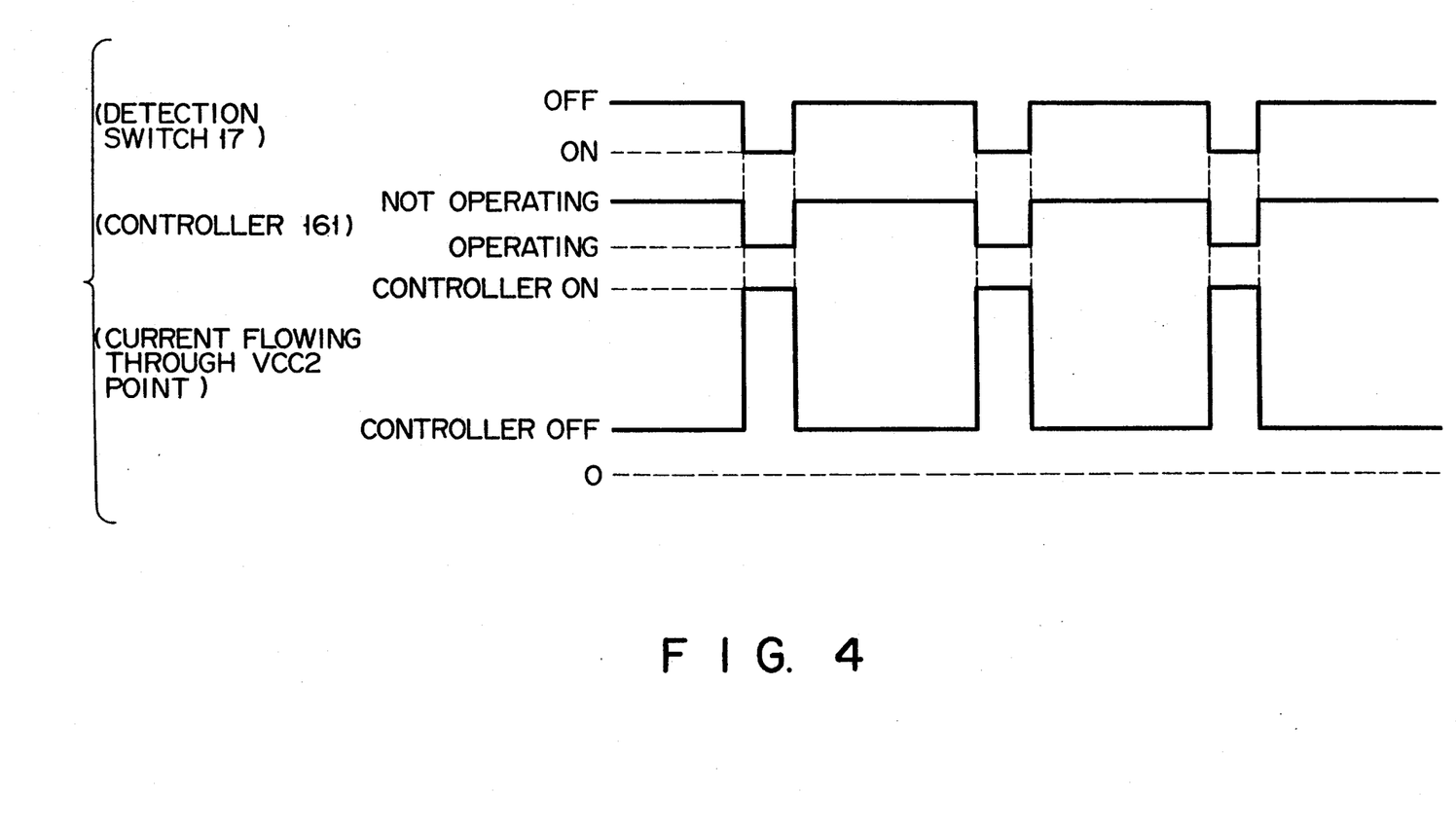

FIG. 4 is a timing chart showing how the camera control apparatus operates during the film-rewinding operation mentioned above.

As is clear in FIG. 4, the current flowing through the charge voltage (Vcc2) point is maximum during the ON state of the detection switch 17. This is because the controller 161 of the control unit 16, the timer circuit 164 thereof, and the pull-up resistor 18 of the detection switch 17 consume a large amount of current at the time. However, the controller 161 is maintained in the standby state during the OFF state of the detection switch 17. Therefore, the current flowing through the charge voltage point corresponds only to the sum of the currents used by the output latch circuit 165, the timer circuit 164 and the system clock circuit 163. In other words, the current which the control sections 6 of the camera main body might consume if they were actuated by the controller 161 is excluded from the maximum current mentioned above.

The camera control apparatus shown in FIG. 2 can be modified, without any substantial change, such that a rise in the level of the monitor signal which occurs when the detection switch 17 is turned off is added as a standby-releasing condition. The film-rewinding operation performed by such a modified apparatus will be explained, with reference to the flowchart shown in FIG. 5.

Figure 5:
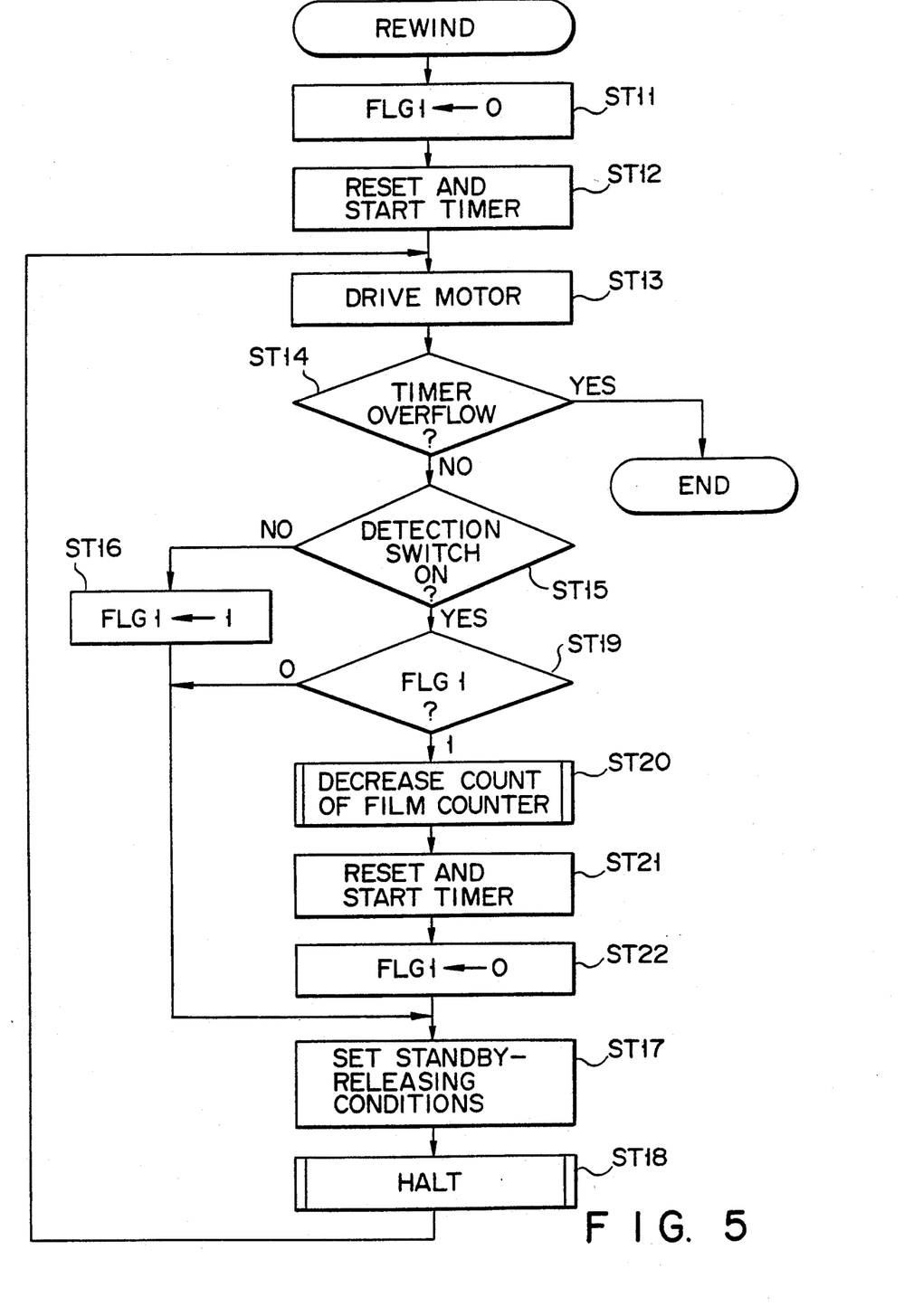
FIGS. 5 through 7 illustrate a case where either the ON- or OFF-state of the detection switch (FIG. 2) and the overflow state of the timer circuit (FIG. 2) are utilized as standby-releasing conditions, FIG. 5 being a flowchart according to which the film-rewinding operation is performed, FIG. 6 being a timing chart showing how the camera control apparatus operates during the film-rewinding operation, and FIG. 7 being a flowchart according to which the film is advanced by one frame.

Assume that a film-rewinding command is given in the same manner as mentioned above. In response to the command, flag FLG1 indicating the state of the detection switch 17 is cleared in step ST11.

Then, a counting-start command is supplied to the timer circuit 164 (step ST12), and the motor 14 is driven under the control of the motor-driving circuit 13, to thereby start the rewinding of the film F (step ST13).

Thereafter, a check is made in step ST14 to see whether or not the timer circuit 164 overflows. If it is found out that the timer circuit 164 is not in an overflow state, then the state of the detection switch 17 is checked in step ST15.

If the detection switch 17 is OFF, "1" is set to flag FLG1 in step ST16, and then the standby conditions are set in step ST17. Accordingly, the controller 161 is brought into the standby state (HALT) in step ST18. The controller 161 is released from this standby state if the state of the detection switch 17 changes from ON to OFF, or vice versa, and the procedures starting from step ST13 are repeated.

If it is found out in step ST15 that the detection switch 17 is ON and is also found out in step ST19 that the value of flag FLG1 is "0", then it is determined that the state of the detection switch 17 has remained unchanged. In this case, the procedures starting from step ST17 are repeated.

If it is found out in step ST15 that the detection switch 17 is ON and is also found out in step ST19 that the value of flag FLG1 is "1", then it is determined the state of the detection switch 17 has changed from OFF to ON. In this case, the flow advances to step ST20, wherein the count of the film counter 19 is decreased.

After the count of the film counter 19 is decreased in accordance with the one-frame movement of the film F in the manner mentioned above, the timer circuit 164 is reset and started once again in step ST21. Accordingly, the contents in flag FLG1 are cleared in step ST22. Thereafter, the procedures starting from step ST17 are repeated.

If it is determined in step ST14 that the timer circuit 164 has overflowed, the controller 161 is brought into an operative state, and the rewinding operation completed.

Figure 6:
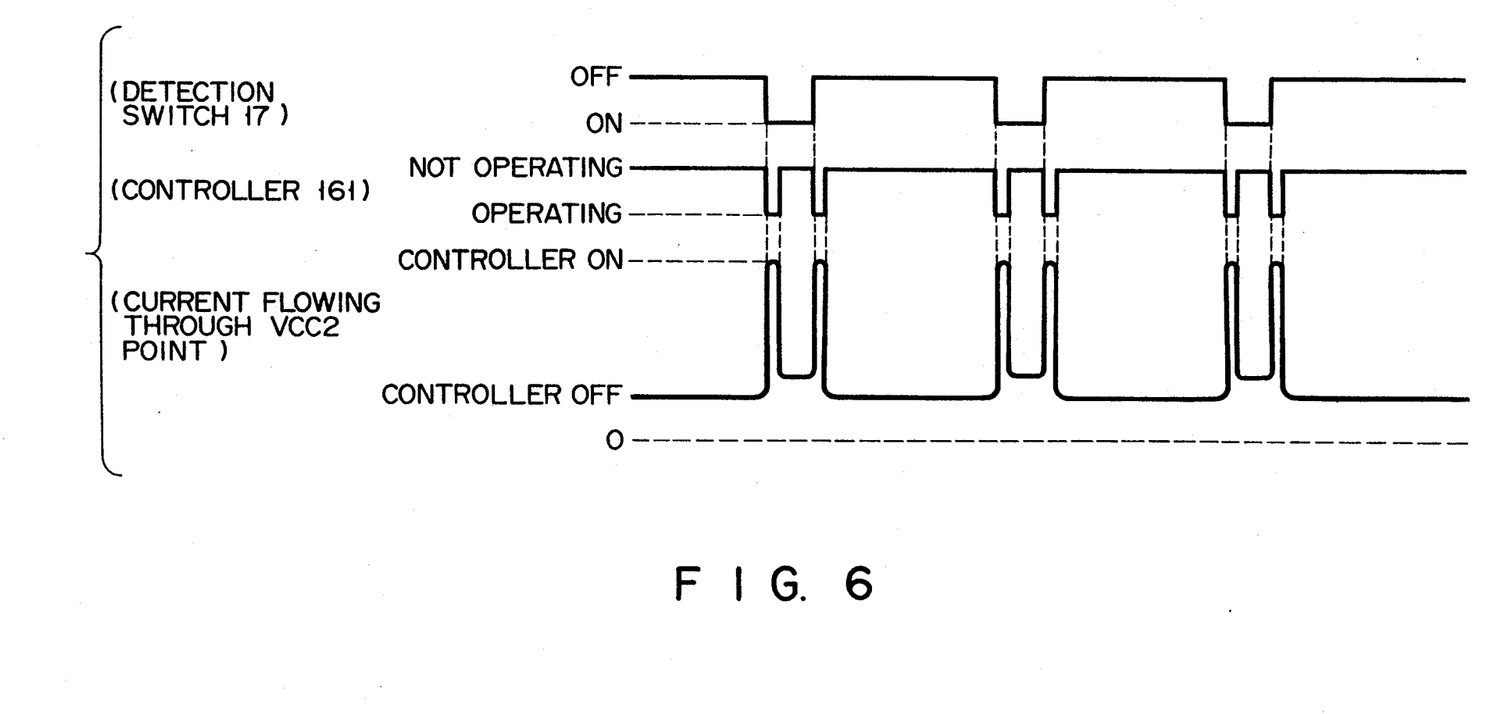

FIG. 6 is a timing chart showing how the camera control apparatus operates during the film-rewinding operation in the case where the time at which the detection switch 17 is turned off is added as a standby-releasing condition.

As is clear in FIG. 6, the current flowing through the charge voltage (Vcc2) point includes the current consumed by the controller 161 only when the detection switch 17 changes from OFF to ON or vice versa. While the detection switch 17 is ON the current flowing through the charge voltage (Vcc2) point corresponds to the sum of the current consumed by the controller 161 and that consumed by the pull-up resistor 18.

The camera control apparatus shown in FIG. 2 can be modified, without any substantial change, such that a level fall caused by the switching of the detection switch 17 between ON and OFF or the overflow state of the timer circuit 164 of the control unit 16 is added as a standby-releasing condition. The one frame-advancing advancing operation performed by such a modified apparatus will be explained, with reference to the flowchart shown in FIG. 7.

Figure 7:
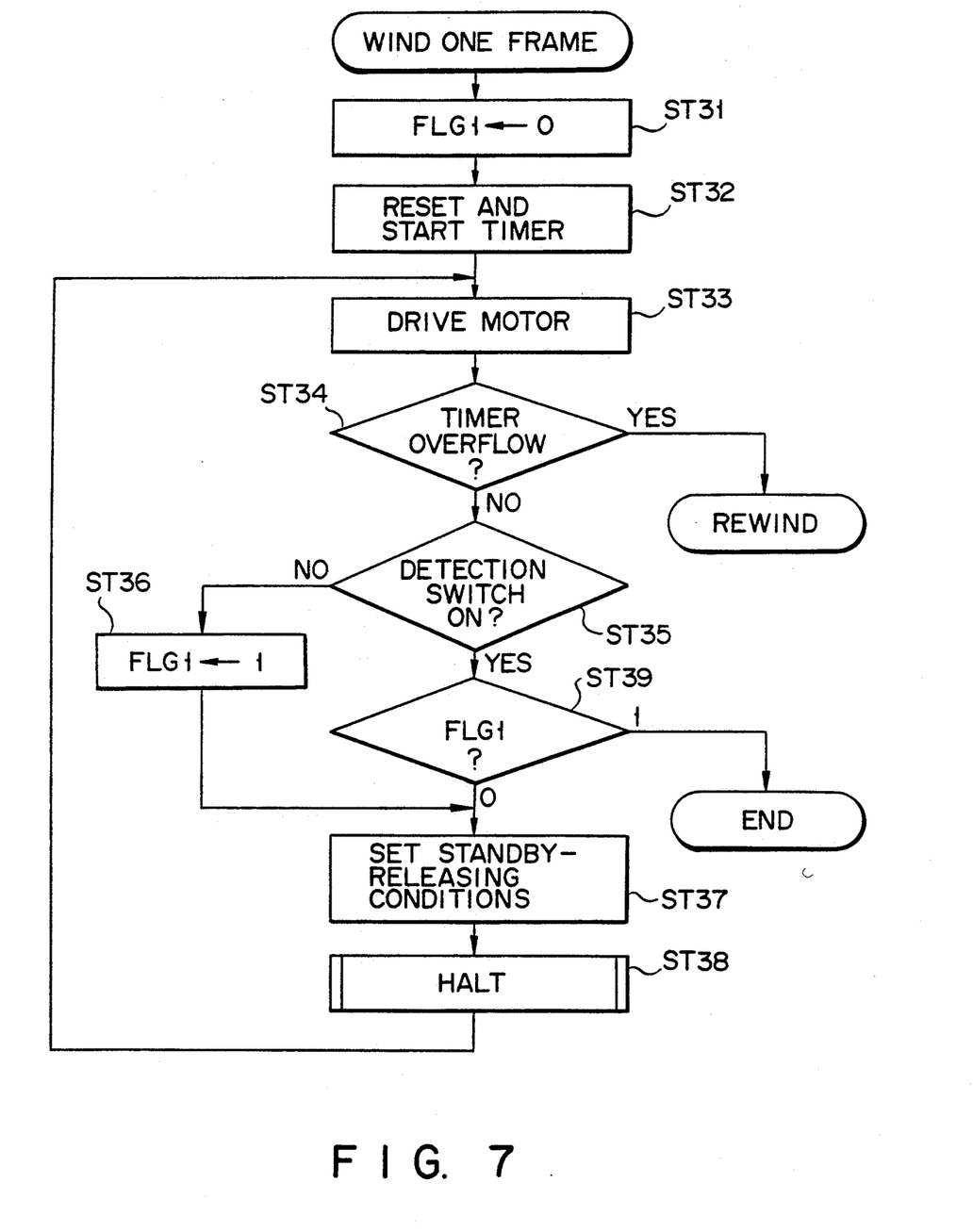

Assume that a film-winding command is supplied from the operation section 20 to the control unit 16, so as to start photography. In response to the command, the controller 161 clears, in step ST31, the contents in flag FLG1 which is indicative of the state of the detection switch 17.

Then, a counting-start command is supplied to the timer circuit 164 (step ST32), and the motor 14 is driven under the control of the motor-driving circuit 13, to thereby start the winding of the film F (step ST33).

Thereafter, a check is made in step ST34 to see whether or not the timer circuit 164 overflows. If it is found out that the timer circuit 164 is not in an overflow state, the state of the detection switch 17 is subsequently checked in step ST35.

If the detection switch 17 is OFF, "1" is set to flag FLG1 in step ST36, and then the standby conditions are set in step ST37. Accordingly, the controller 161 is brought into the standby state (HALT) in step ST38. The controller 161 is released from this standby state if the state of the detection switch 17 changes from ON to OFF, or vice versa, and the procedures starting from step ST33 are repeated.

If it is found out in step ST35 that the detection switch 17 is ON and is also found out in step ST39 that the value of flag FLG1 is "0", then it is determined that the state of the detection switch 17 has remained unchanged. In this case, the procedures starting from step ST37 are repeated.

If it is found out in step ST35 that the detection switch 17 is ON and is also found out in step ST39 that the value of flag FLG1 is "1", then it is determined the state of the detection switch 17 has changed from OFF to ON. In this case, the controller 161 is brought into the operative state, and the count of the film counter 19 is increased, to thereby complete the one-frame advancing operation of the film F.

If it is determined in step ST34 that the timer circuit 164 has overflowed, the controller 161 is brought into an operative state, and the flow advances to the subroutine (procedure flow) for the rewinding operation mentioned above.

As mentioned above, the film-rewinding operation and the film-winding operation can be performed by executing similar procedures.

Figure 8:
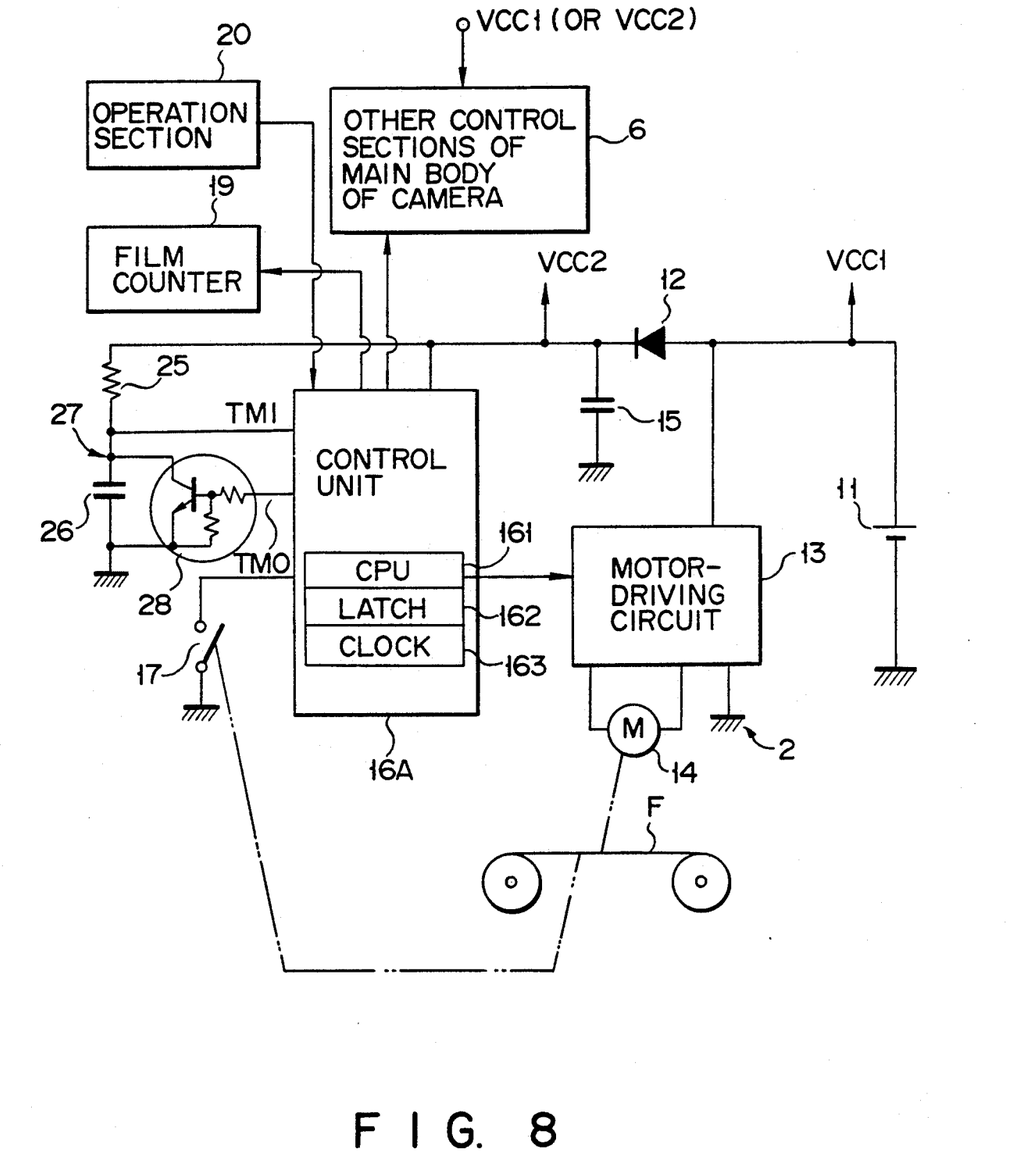
FIGS. 8 through 10 show another embodiment of the present invention, FIG. 8 showing how a film-driving device is designed in the case where a timer circuit is externally provided, FIG. 9 being a flowchart according to which a film-rewinding operation is performed, and FIG. 10 being a timing chart showing how the camera control apparatus operates during the film-rewinding operation.

FIG. 8 shows the second embodiment of the present invention.

In the camera control apparatus of the second embodiment, a timer circuit 27 (a CR circuit) made up of a resistor 25 and a capacitor 26 is externally provided for a control unit 16A, and this control unit 16A does not incorporate any timer circuit. The timer circuit 27 has a time constant which is determined by the resistor 25, the capacitor 26 and the threshold voltage of input terminal TMI of the control unit 16A.

The timer circuit 27 need not be the CR circuit mentioned above, but may be constituted by a timer IC which is of a low current consumption type.

A transistor 28 is provided to release the electric charge from the capacitor 26. It is connected to output terminal TMO of the control unit 16A and its operation is controlled by the control unit 16A.

In the camera control apparatus of the second embodiment, the timer circuit 27 is externally provided for the control unit 16A. Therefore, the controller 161 and system clock 163 of the control unit 16A can be simultaneously brought into the standby state (STOP).

The operation of the second embodiment will be described.

Figure 9:
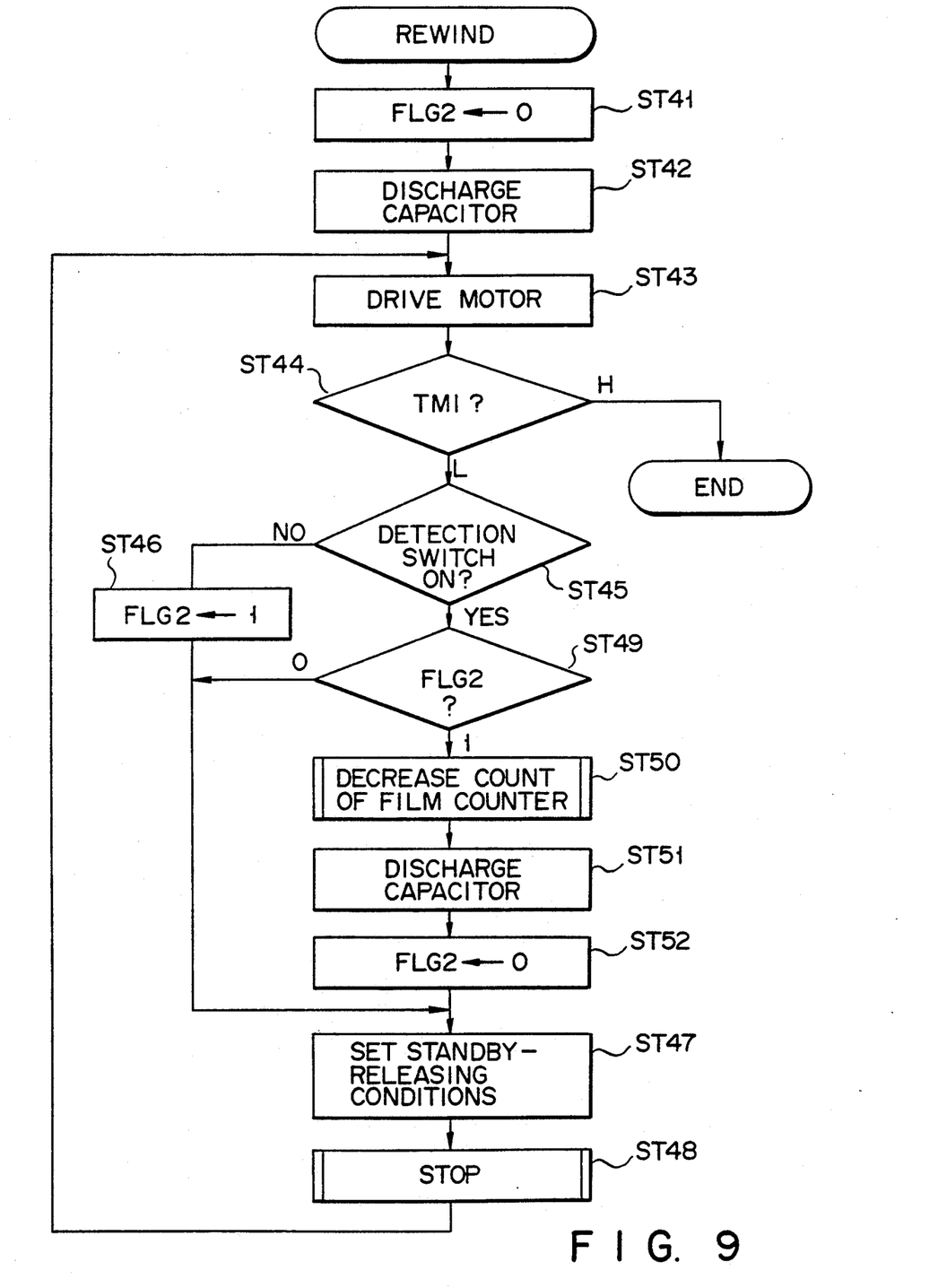

FIG. 9 is a flowchart showing how a film-rewinding operation is performed in the case where a level fall caused when the detection switch 17 is turned on, a level rise caused when the detection switch 17 is turned off, and a signal level change from low (L) to high (H) at input terminal TMI are utilized as standby state-releasing conditions.

Assume that a film-rewinding command is supplied from the operation section 20 in the manner mentioned above. In response to the command, the controller 161 clears, in step ST41, the contents in flag FLG2 which is indicative of the state of the detection switch 17.

Then, a high-level signal is kept output for a predetermined time from output terminal TMO of the control unit 16A. Accordingly, the electric charge is released from the capacitor 26 in step ST42, due to the action of the transistor 28.

Next, the motor 14 is driven under the control of the motor-driving circuit 13, to thereby start the movement of the film F (step ST43).

Thereafter, a check is made in step ST44 to see whether or not the signal supplied to input terminal TMI is high in level. If it is found out that the signal is not high in level, the state of the detection switch 17 is subsequently checked in step ST45.

If the detection switch 17 is OFF, "1" is set to flag FLG2 in step ST46, and then the above-mentioned standby conditions are set in step ST47. Accordingly, the controller 161 is brought into the standby state (STOP) in step ST48. The controller 161 is released from this standby state if the state of the detection switch 17 changes from ON to OFF, or vice versa and if the signal supplied to input terminal TMI of the control unit 16A rises in level (i.e., a change from the low level to the high level). After the controller 161 is released from the standby state, the procedures starting from step ST43 are repeated.

If it is found out in step ST45 that the detection switch 17 is ON and is also found out in step ST49 that the value of flag FLG2 is "0", then it is determined that the state of the detection switch 17 has remained unchanged. In this case, the procedures starting from step ST47 are repeated.

If it is found out in step ST45 that the detection switch 17 is ON and is also found out in step ST49 that the value of flag FLG2 is "1", then it is determined the state of the detection switch 17 has changed from OFF to ON. In this case, the count of the film counter 19 is decreased in step ST50.

After the count of the film counter 19 is decreased in accordance with the one-frame movement of the film F, the electric charge is released from the capacitor 26 once again in step ST51, and then the contents in flag FLG2 are cleared in step ST52. Thereafter, the procedures starting from step ST47 are repeated.

If it is found out in step ST44 that the signal supplied to input terminal TMI of the controller unit 16A is high in level, then the controller 161 is brought back into the operative state, and the rewinding operation completed.

Figure 10:
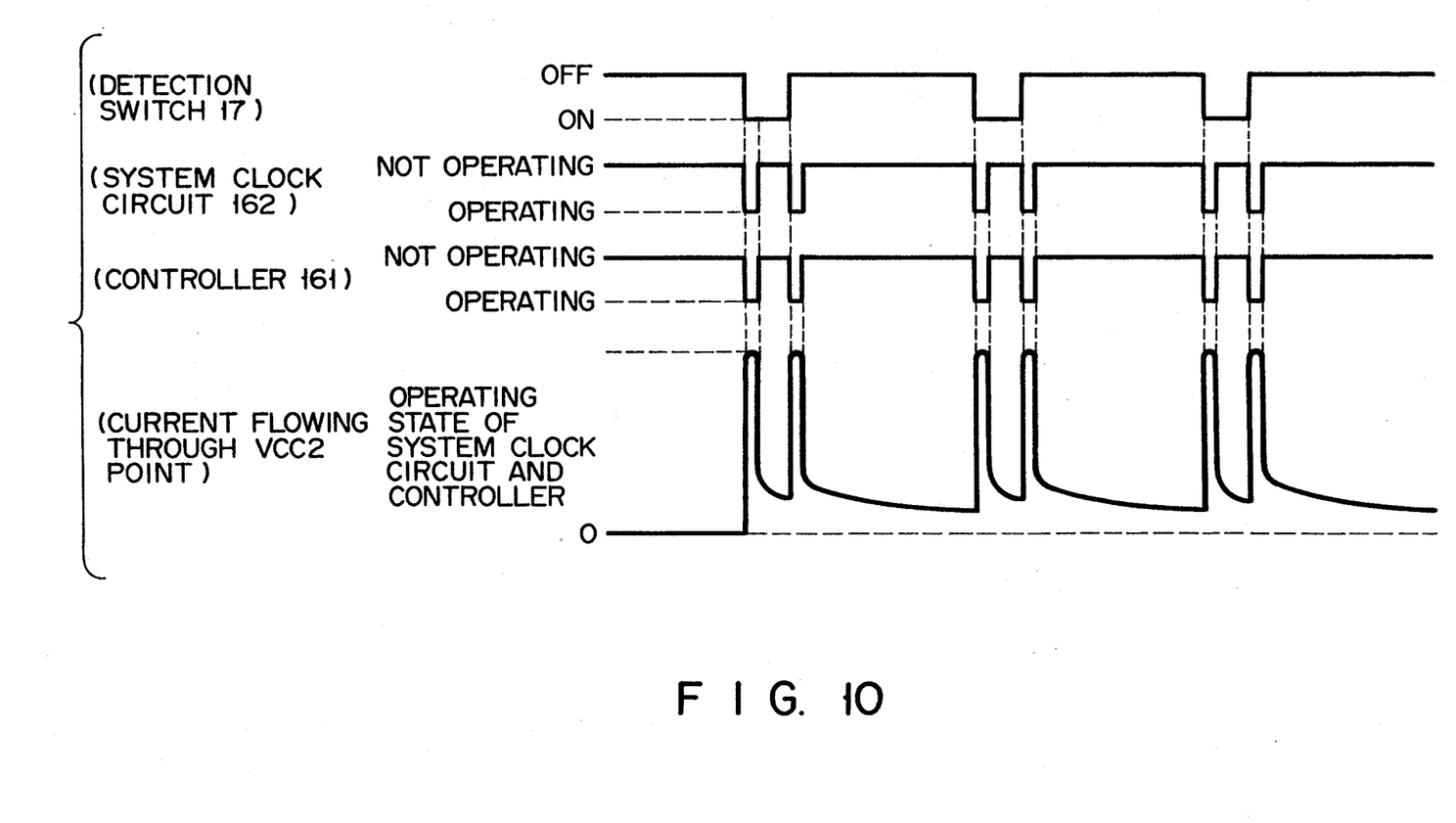

FIG. 10 is a timing chart showing how the camera control apparatus of the second embodiment operates during the film-rewinding operation mentioned above.

As is clear in FIG. 10, the system clock circuit 163 and the controller 161 are set in an operative state only when the detection switch 17 changes from OFF to ON (or from ON to OFF). At the time, therefore, the current flowing through the charge voltage (Vcc2) point becomes maximum. In contrast, when the detection switch 17 is ON, both the system clock circuit 163 and the controller 161 are set in an inoperative state (STOP), so that the current flowing through the charge voltage (Vcc2) point describes a curve similar to the charging curve of the capacitor 26.

As mentioned above, the present invention can be easily applied even to the case where the control unit 16A does not incorporate a timer circuit. In this case as well, the amount of current flowing through the charge voltage (Vcc2) point can be reduced, and the power provided by the power source 11 (e.g., a battery) can be saved.

Next, a description will be given as to what capacitance the capacitor 15 should have in order to compensate for a decrease in the charge voltage Vcc2, with the film-rewinding operation shown in FIG. 5 being taken as an example. The capacitance of the capacitor 15 is calculated, subject to the following conditions:

(1) The charge voltage Vcc2 is 3.0 V at the start of the rewinding operation, and the minimum operating voltage of the control unit 16 is 2.0 V;
(2) The current which the control unit 16 consumes when its controller 161 and system clock circuit 163 are simultaneously operating is 5.0 mA, and the current which the control unit 16 consumes in the standby state (i.e., the time when no structural component other than the system clock circuit 163 and the output latch circuit 162 is operating) is 0.3 mA;
(3) The detection switch 17 changes from OFF to ON once in two seconds, and the ON-state duration of the detection switch 17 is 0.2 seconds;
(4) The leak current in the ON state of the detection switch 17 is 0.03 mA;
(5) The time in which the controller 161 operates at one time is 1 ms; and
(6) The time needed to completely rewind the film F is 72 seconds.

If, under these conditions, the entirety of the controller 161 is kept in an operating state throughout the film-rewinding operation, as in the prior art, then the average current $I_{AVE}$ flowing through the charge voltage (Vcc2) point during the rewinding operation is given by:

$$I_{AVE} = 5.0[mA] + 0.3[mA] \times 0.2[sec]/2[sec]$$
$$\doteq 5.0[mA]$$

In this case, the capacitance C which the capacitor should use for backup is given by:

$$C = (5.0[mA] \times 72[sec])/1[V]$$
$$\doteq 0.36[F]$$

On the other hand, if the controller 161 operates intermittently under the control of the apparatus of the present invention, then the average current $I_{AVE15}$ flowing through the charge voltage (Vcc2) point during the rewinding operation is given by:

$$I_{AVE15} = (5.0[mA] + 0.03[mA]) \times 1[ms] \times 2/2[sec] +$$
$$(0.3[mA] + 0.03[mA]) \times (0.2[sec] - 1[ms]) \times$$
$$2)/[sec] + 0.3[mA] \times (2[sec] - 0.2[sec])/2[sec]$$
$$\doteq 0.005[mA] + 0.033[mA] + 0.27[mA]$$
$$\doteq 0.308[mA]$$

In this case, the capacitance $C_{15}$ which the capacitor 15 should use for backup is given by:

$$C_{15} = (0.308[mA] \times 72[sec])/1[V]$$
$$= 0.022[F]$$

As can be understood from the above, the capacitance which the capacitor 15 used in the embodiments of the present invention should have is only 1/16 of that of the capacitor used in the prior art. According to the present invention, therefore, a small-capacitance capacitor can be employed to back up the power source voltage which decreases when the film is wound or rewound.

In the present invention, the controller is brought into a standby state when the film is being wound or rewound. In this way, the power consumption by the controller is reduced during the winding or rewinding of the film. Therefore, the power supplied to the control unit can be backed up by use of a small-capacitance capacitor, which is small in size and low in price.

As described in the foregoing, the camera control apparatus according to the present invention can be low in price and small in size, eliminates the need to employ a booster circuit or a large-capacitance capacitor and therefore requires no wide installation space, and prevents the power source voltage from decreasing and becoming too low to drive the controller even when the film inside the camera is being wound or rewound.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims

What is claimed is:
1. A camera control apparatus comprising:
   film-moving means, having a motor, for moving a film loaded in a camera;
   controller means for controlling various control sections incorporated in the camera, said controller means outputting a predetermined control signal in accordance with a film-moving command and supplying the predetermined control signal to the film-moving means, said controller means including means for bringing itself into a standby condition;
   latch means for latching the predetermined control signal output by the controller means to thereby allow the film-moving means to be continuously driven;
   monitor means for generating a monitor signal in accordance with a state in which the film is moved by the film-moving means;
   timer means for starting measurement of a predetermined time interval in response to the predetermined control signal output by the controller means and generating an end signal at the end of the measurement; and
   standby-releasing means for supplying a stand state-releasing signal to the controller means in accordance with one of the end signal generated by the timer means and the monitor signal generated by the monitor means.
2. A camera control apparatus according to claim 1, wherein said film-moving means is supplied with a driving current directly from a power source, and said controller means is supplied with a driving current from the power source through a capacitor and a diode, said capacitor being for backing up voltage provided by the power source, and said diode being for compensating for a decrease which charging voltage undergoes due to the provision of the capacitor.
3. A camera control apparatus according to claim 2, wherein said controller means includes means for supplying a timer resetting/starting signal to the timer means, and means for supplying a standby release-allowing signal to the standby-releasing means.
4. A camera control apparatus according to claim 2, wherein said monitor means includes a detection switch which is turned on or off in accordance with the state in which the film is moved.

5. A camera control apparatus according to claim 4, wherein said detection switch is a switch which detects a one frame-advancing movement of the film.

6. A camera control apparatus according to claim 4, wherein:
said controller means includes a CPU, an output latch circuit, a system clock circuit, and a timer circuit;
said output latch circuit constitutes the latch mean; and
said timer circuit starts counting clocks output by the system clock circuit in response to a command supplied from the CPU, whereby said timer circuit constitutes the timer means.

7. A camera control apparatus according to claim 6, wherein said controller means includes means for bringing only the CPU into a standby state and allowing the output latch circuit, the system clock circuit and the timer circuit to remain in an operative state.

8. A camera control apparatus according to claim 7, wherein said controller means includes means for establishing the standby state during an interval other than an ON period of the detection switch.

9. A camera control apparatus according to claim 7, wherein said controller means includes means for establishing the standby state during an interval other than a predetermined length of time after the detection switch changes from OFF to ON and other than a predetermined length of time after the detection switch changes from ON to OFF.

10. A camera control apparatus according to claim 1, wherein the state in which the film is moved is a film-wound state or a film-rewound state.

11. A camera control apparatus according to claim 10, further comprising:
film counter means for supplying a count signal to the controller means in accordance with an ON/OFF state of the detection switch.

12. A camera control apparatus according to claim 4, wherein:
said controller means includes a CPU, an output latch circuit, and a system clock circuit;
said output latch circuit constitutes the latch means; and
said timer means includes a CR circuit externally connected to the controller means.

13. A camera control apparatus according to claim 12, wherein said CR circuit has a time constant determined by a threshold voltage of the controller means.

14. A camera control apparatus according to claim 13, wherein said CR circuit is controlled by a switching element which releases electric charge from a capacitor included in the CR circuit in response to a signal output by the controller means.

15. A camera control apparatus according to claim 13, wherein said CR circuit is connected to a point to which the charging voltage is applied.

* * * * *